US011588173B2

(12) United States Patent
Yano et al.

(10) Patent No.: US 11,588,173 B2
(45) Date of Patent: Feb. 21, 2023

(54) ALL-SOLID-STATE LITHIUM ION SECONDARY BATTERY HAVING FLUORINE AND CARBON-CONTAINING LIQUID REPELLENT FILM AND MOUNTED BODY

(71) Applicant: TDK CORPORATION, Tokyo (JP)

(72) Inventors: Tomohiro Yano, Tokyo (JP); Hiroshi Sato, Tokyo (JP); Masayuki Muroi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 197 days.

(21) Appl. No.: 16/498,136

(22) PCT Filed: Mar. 27, 2018

(86) PCT No.: PCT/JP2018/012393
§ 371 (c)(1),
(2) Date: Sep. 26, 2019

(87) PCT Pub. No.: WO2018/181288
PCT Pub. Date: Oct. 4, 2018

(65) Prior Publication Data
US 2020/0106125 A1 Apr. 2, 2020

(30) Foreign Application Priority Data
Mar. 28, 2017 (JP) .............................. JP2017-063163

(51) Int. Cl.
*H01M 10/0525* (2010.01)
*H01M 10/0562* (2010.01)
(Continued)

(52) U.S. Cl.
CPC ... *H01M 10/0525* (2013.01); *H01M 10/0562* (2013.01); *H01M 10/44* (2013.01);
(Continued)

(58) Field of Classification Search
CPC ......... H01M 10/0525; H01M 10/0562; H01M 10/44; H01M 50/183
(Continued)

(56) References Cited

U.S. PATENT DOCUMENTS

2010/0261071 A1* 10/2010 Lopatin ................... H01M 4/66
57/295
2011/0287176 A1 11/2011 Saito et al.
2014/0248524 A1* 9/2014 Wang .................. H01M 50/129
156/182

FOREIGN PATENT DOCUMENTS

JP 2000311710 A * 11/2000
JP 2008226728 A * 9/2008
(Continued)

OTHER PUBLICATIONS

Yeo et al., Design of Experiment for Optimization of Plasma-Polymerized Octafluorocyclobutane Coating on Very High Aspect Ratio Silicon Molds, 2006, Langmuir, 22, 10196-10203 (Year: 2006).*
(Continued)

*Primary Examiner* — Sean P Cullen
(74) *Attorney, Agent, or Firm* — Oliff PLC

(57) ABSTRACT

This solid-state lithium ion rechargeable battery includes a laminated body which includes a positive electrode layer, a negative electrode layer, and a solid electrolyte sandwiched between the positive electrode layer and the negative electrode layer, and a liquid repellent film which is provided to be in contact with the laminated body, in which the liquid repellent film contains a fluorine element and a carbon element, and has a contact angle of 30° or more when an acetic acid aqueous solution is dropped thereon.

8 Claims, 3 Drawing Sheets

(51) Int. Cl.
  *H01M 10/44* (2006.01)
  *H01M 50/183* (2021.01)
  *H01M 4/02* (2006.01)

(52) U.S. Cl.
  CPC .... *H01M 50/183* (2021.01); *H01M 2004/027* (2013.01); *H01M 2004/028* (2013.01)

(58) Field of Classification Search
  USPC .................................................. 429/124, 163
  See application file for complete search history.

(56) References Cited

FOREIGN PATENT DOCUMENTS

| JP | 2012-009255 A | 1/2012 |
|---|---|---|
| JP | 2013-062550 A | 4/2013 |
| JP | 2014-102911 A | 6/2014 |
| JP | 2015-079702 A | 4/2015 |
| JP | 2015-164116 A | 9/2015 |
| JP | 2015-220102 A | 12/2015 |
| JP | 2015-220106 A | 12/2015 |
| JP | 2015-220107 A | 12/2015 |
| JP | 2015220102 A * | 12/2015 |

OTHER PUBLICATIONS

Ningel et al., Characterizing the remote plasma polymerization of octafluorocyclobutane induced by RF-driven hollow-cathode discharge, 1998, Surface and Coatings Technology, 98, 1142-1147 (Year: 1998).*

Kammermaier et al., Emission Spectra Relevant to Polymerization of Octafluorocyclobutane in Low Pressure Microwave Plasmas, 1985, International Plasma Chemistry Society, 07, 1244-1249 (Year: 1985).*

Jul. 3, 2018 International Search Report issued in International Application No. PCT/JP2018/012393.

English-language translation of Sep. 14, 2021 Office Action issued in Japanese Patent Application No. 2019-509873.

Mar. 16, 2022 Office Action issued in Chinese Patent Application No. 201880021602.1.

Nov. 18, 2022 Office Action issued in Chinese Patent Application No. 201880021602.01.

* cited by examiner

ALL-SOLID-STATE LITHIUM ION SECONDARY BATTERY HAVING FLUORINE AND CARBON-CONTAINING LIQUID REPELLENT FILM AND MOUNTED BODY

TECHNICAL FIELD

The present disclosure relates to a solid-state lithium ion rechargeable battery and a mounted body.

Priority is claimed on Japanese Patent Application No. 2017-063163, filed Mar. 28, 2017, the content of which is incorporated herein by reference.

BACKGROUND ART

Conventionally, using a flame-retardant polymer electrolyte or ionic liquid as a battery electrolyte has been considered. However, both these electrolytes contain organic liquids. According to this, in batteries using these materials, it is difficult to eliminate fears such as of fluid leaks or fluid depletion.

On the other hand, a solid-state lithium ion rechargeable battery using a ceramic as an electrolyte is inherently incombustible and highly safe. For this reason, all solid-state lithium ion secondary batteries have attracted attention in recent years.

In a solid-state lithium ion rechargeable battery, for example, $LiCoO_2$, $LiMn_2O_4$, $LiFePO_4$, $LiNiO_2$, and the like are used as active materials. These active materials are likely to react with water and deteriorate. Deteriorated active materials may cause a decrease in battery capacity of the solid-state lithium ion rechargeable battery.

For example, in Patent Document 1, a ceramic electronic part whose component bodies are covered with a water repellent agent to prevent the deterioration of active materials due to the reaction with water is disclosed. The water repellent agent is used in a state in which it is dissolved in a supercritical fluid as a solvent.

However, even if water is prevented from entering a solid-state lithium ion rechargeable battery, when all solid-state lithium ion secondary batteries are mounted, a fixed proportion thereof may fail in some cases.

In the technology described in Patent Document 1, it is possible to prevent water from entering a solid-state lithium ion rechargeable battery. However, it is not possible to sufficiently prevent an organic acid from entering a solid-state lithium ion rechargeable battery. An organic acid, which has a smaller surface tension than water, is more likely to penetrate inside and causes a failure.

In addition, in Patent Document 1, a part of a water repellent agent of the surface is removed to improve solder wettability. Since the portion from which the water repellent agent has been removed is in direct contact with the solder, an organic acid is more likely to enter it.

Furthermore, it is difficult to apply the method described in Patent Document 1 to a solid-state lithium ion rechargeable battery. In Patent Document 1, the water repellent agent is caused to penetrate into fine nano-level voids or portions present deep inside a component body using a supercritical fluid. However, if a water repellent agent without conductivity is caused to penetrate to the inside, it may cause a decrease in battery capacity of all solid-state lithium ion secondary batteries.

CITATION LIST

Patent Literature

[Patent Document 1]
Japanese Unexamined Patent Application, First Publication No. 2013-62550

SUMMARY OF INVENTION

Technical Problem

The present disclosure has been made in view of the above problems, and an object thereof is to provide a solid-state lithium ion rechargeable battery and a mounted body in which erosion of a solid electrolyte by an organic acid (flux) and failure thereof can be curbed.

Solution to Problem

The present inventor performed intensive research in order to solve the above problems.

As a result, it was found that the organic acid contained in the solder used in a reflow process at the time of manufacturing erodes a solid active material and causes a failure of a solid-state lithium ion rechargeable battery.

The present disclosure provides the following features to solve the problems described above.

(1) A solid-state lithium ion rechargeable battery according to a first aspect of the present disclosure includes a laminated body which includes a positive electrode layer, a negative electrode layer, and a solid electrolyte sandwiched between the positive electrode layer and the negative electrode layer, and a liquid repellent film which is provided to be in contact with the laminated body, in which the liquid repellent film contains a fluorine element and a carbon element, and has a contact angle of 30° or more when an acetic acid aqueous solution is dropped thereon.

It is preferable that the solid-state lithium ion rechargeable battery described above have the following features. It is also preferable that these features be combined with each other.

(2) In the solid-state lithium ion rechargeable battery according to the aspect described above, an existence ratio of the fluorine element with respect to the carbon element in the liquid repellent film may be 0.6 times or more and 2.5 times or less.

(3) In the solid-state lithium ion rechargeable battery according to the aspect described above, an existence ratio of a fluorine element detected when the liquid repellent film is measured from an outer surface side using X-ray photoelectron spectroscopy may be 35% or more.

(4) In the solid-state lithium ion rechargeable battery according to the aspect described above, an existence ratio of an oxygen element detected when the liquid repellent film is measured from the outer surface side using the X-ray photoelectron spectroscopy may be 10% or less.

(5) In the solid-state lithium ion rechargeable battery according to the aspect described above, existence ratios of a hydrogen element and a silicon element in the liquid repellent film may be 1 mol % or less.

(6) In the solid-state lithium ion rechargeable battery according to the aspect described above, a thickness of the liquid repellent film may be 1 μm or less.

(7) In the solid-state lithium ion rechargeable battery according to the aspect described above, a heat resistance of the liquid repellent film may be 200° C. or more.

(8) In the solid-state lithium ion rechargeable battery according to the aspect described above, the positive electrode layer, the negative electrode layer, and the solid electrolyte sandwiched between the positive electrode layer and the negative electrode layer may have a relative density of 80% or more.

(9) A mounted body according to a second aspect of the present disclosure includes the solid-state lithium ion rechargeable battery according to the aspect described above, an external terminal connected to each of a positive electrode layer and a negative electrode layer of the solid-state lithium ion rechargeable battery, and a substrate which is joined to the external terminal and the solid-state lithium ion rechargeable battery via a solder.

Advantageous Effects of Invention

The solid-state lithium ion rechargeable battery and the mounted body according to the aspect described above can prevent an entry of an organic acid and reduce a failure rate of the solid-state lithium ion rechargeable battery.

DESCRIPTION OF EMBODIMENTS

Figure 1:
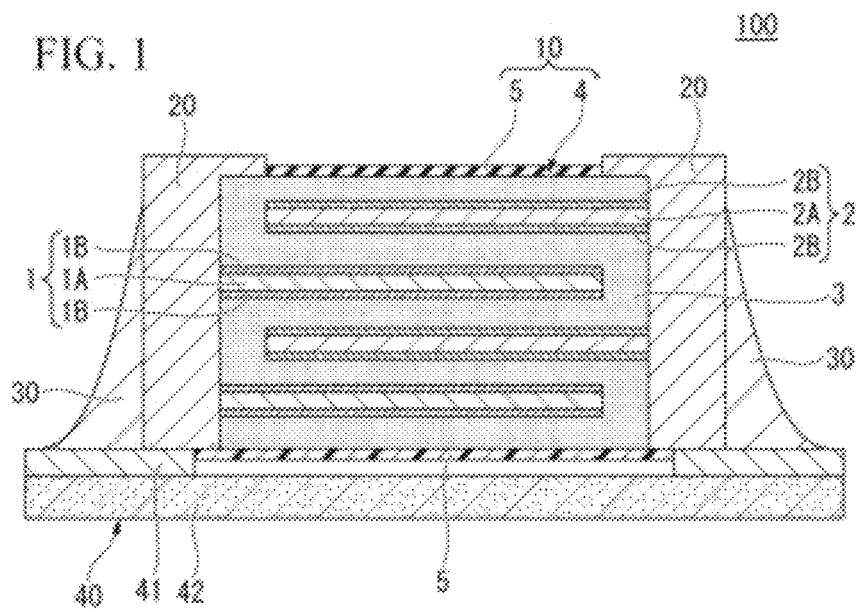
FIG. 1 is a schematic cross-sectional view which shows a preferred example of a mounted body according to a first embodiment of the present disclosure.

Hereinafter, preferred examples of the present disclosure will be described in detail by appropriately referring to the drawings. In the drawings used in the following description features may be shown in an enlarged manner for convenience and to aid understanding of the features of the present disclosure. Therefore, dimensional ratios or the like of respective components shown in the drawings may be the same as or different from actual ones. Materials, dimensions, and the like exemplified in the following description are examples, and the present disclosure is not limited thereto, and appropriate changes can be made within a range not changing the gist of the present disclosure.

In addition, in the following description, omission, addition, changes, substitutions, exchanges, and the like can be made for the number, a position, a size, a quantity, a type, a member, a dimension, a combination, and the like within a range not departing from the scope of the present disclosure.

[Mounted Body]

FIG. 1 is a schematic cross-sectional view of a mounted body according to a first embodiment. As shown in FIG. 1, a mounted body 100 includes a solid-state lithium ion rechargeable battery 10, an external terminal 20, solder 30, and a substrate 40.

The substrate 40 has a supporting body 42 and an electrode 41. The electrode 41 and the external terminal 20 are electrically connected to each other via the solder 30. The external terminal 20 is connected to a first electrode layer 1 or a second electrode layer 2 of the solid-state lithium ion rechargeable battery 10.

[Solid-State Lithium Ion Rechargeable Battery]

The solid-state lithium ion rechargeable battery includes a laminated body 4 and a liquid repellent film 5.

(Laminated Body)

As shown in FIG. 1, the laminated body 4 includes one or more first electrode layers 1, one or more second electrode layers 2, and a solid electrolyte 3 sandwiched between the first electrode layers 1 and the second electrode layers 2 which are vertically adjacent to each other.

Each of the first electrode layers 1 is connected to the external terminals 20 provided on one end side (a left side in FIG. 1). Each of the second electrode layers 2 is connected to another external terminal 20 provided on the other end side (a right side in FIG. 1). That is, in the present example, the first electrode layers 1 and the second electrode layers 2 are connected to two different external terminals 20, and are embedded in the solid electrolyte 3 without direct contact with each other.

In the first electrode layer 1 and the second electrode layer 2, one electrode layer functions as a positive electrode layer, and the other electrode layer functions as a negative electrode layer. A polarity of the electrode layer changes depending on which polarity is connected to the external terminal. Hereinafter, the first electrode layer 1 is set as a positive electrode layer 1 and the second electrode layer 2 is set as a negative electrode layer 2 to facilitate understanding.

As shown in FIG. 1, the positive electrode layer 1 and the negative electrode layer 2 are alternately laminated with the solid electrolyte 3 therebetween. Charging and discharging of the solid-state lithium ion rechargeable battery 10 is performed by an exchange of lithium ions via the solid electrolyte 3 between the positive electrode layer 1 and the negative electrode layer 2.

<Positive Electrode Layer and Negative Electrode Layer>

The positive electrode layer 1 includes a positive electrode current collector layer 1A and a positive electrode active material layer 1B containing a positive electrode active material. The negative electrode layer 2 includes a negative electrode current collector layer 2A and a negative electrode active material layer 2B containing a negative electrode active material.

It is preferable that the positive electrode current collector layer 1A and the negative electrode current collector layer 2A be layers having high conductivity. For this reason, it is preferable to use, for example, at least one selected from silver, palladium, gold, platinum, aluminum, copper, nickel, and the like for the positive electrode current collector layer 1A and the negative electrode current collector layer 2A. It is also preferable that they are formed from any one of these. Among these materials, copper is less likely to react with a positive electrode active material, a negative electrode active material, and a solid electrolyte. For this reason, if copper is used for the positive electrode current collector layer 1A and the negative electrode current collector layer 2A, for example, if these layers are formed only from copper or formed mainly from copper, it is possible to reduce internal resistance of the solid-state lithium ion rechargeable battery 10. Note that materials constituting the positive electrode current collector layer 1A and the negative electrode current collector layer 2A may be the same as or may be different from each other.

The positive electrode active material layer 1B is formed on one side or both sides of the positive electrode current collector layer 1A. For example, among the positive electrode layer 1 and the negative electrode layer 2, when the positive electrode layer 1 is formed on a top layer of the laminated body 4 in the lamination direction, there is no opposing negative electrode layer 2 on the positive electrode layer 1 positioned on the top layer. For this reason, the positive electrode active material layer 1B in the positive electrode layer 1 positioned on the top layer needs to be on only one side which is below in the lamination direction.

The negative electrode active material layer 2B, similarly to the positive electrode active material layer 1B, is also formed on one side or both sides of the negative electrode current collector layer 2A. For example, among the positive electrode layer 1 and the negative electrode layer 2, when the negative electrode layer 2 is formed on a bottom layer of the laminated body 4 in the lamination direction, the negative electrode active material layer 2B in the negative electrode layer 2 positioned on the bottom layer should be on only one side which is above in the lamination direction.

The positive electrode active material layer 1B and the negative electrode active material layer 2B include a positive electrode active material and a negative electrode active material which exchange electrons, respectively. In addition to this, they contain a conductive auxiliary agent, a binder, and the like if necessary. It is preferable that the positive electrode active material and the negative electrode active material be capable of efficiently inserting and removing lithium ions.

It is preferable that, for example, a transition metal oxide or a transition metal complex oxide be used for the positive electrode active material and the negative electrode active material. Specifically, it is possible to use a lithium manganese complex oxide $Li_2Mn_aMa_{1-a}O_3$ ($0.8 \le a \le 1$, Ma=Co,Ni), lithium cobaltate ($LiCoO_2$), lithium nickelate ($LiNiO_2$), lithium manganese spinel ($LiMn_2O_4$), a complex metal oxide represented by a general formula: $LiNi_xCo_yMn_zO_2$ ($x+y+z=1$, $0 \le x \le 1$, $0 \le y \le 1$, $0 \le z \le 1$), a lithium vanadium compound ($LiV_2O_5$), olivine-type $LiMbPO_4$ (however, Mb is one or more elements selected from Co, Ni, Mn, Fe, Mg, Nb, Ti, Al, and Zr), a lithium vanadium phosphate ($Li_3V_2(PO_4)_3$ or $LiVOPO_4$, a Li-rich solid solution represented by $Li_2MnO_3$-$LiMcO_2$ (Mc=Mn, Co, Ni), lithium titanate ($Li_4Ti_5O_{12}$), a complex metal oxide represented by $Li_sNi_tCo_uAl_vO_2$ ($0.9<s<1.3$, $0.9<t+u+v<1.1$), or the like.

The negative electrode active material and the positive electrode active material may be preferably selected in accordance with the solid electrolyte 3 described above. For example, when $Li_{1+n}Al_nTi_{2-n}(PO_4)_3$ ($0 \le n \le 0.6$) is used for the solid electrolyte 3, it is preferable that one or both of $LiVOPO_4$ and $Li_3V_2(PO_4)_3$ be used as the positive electrode active material and the negative electrode active material. A join on interfaces between the positive electrode active material layer 1B and the solid electrolyte 3, and between the negative electrode active material layer 2B and the solid electrolyte 3 thus becomes strong. In addition, a contact area on the interfaces between the positive electrode active material layer 1B and the solid electrolyte 3, and between the negative electrode active material layer 2B and the solid electrolyte 3 can be increased.

There is no clear distinction between the active materials constituting the positive electrode active material layer 1B or the negative electrode active material layer 2B. The potentials of the two types of compound can be determined by comparison. A compound exhibiting a higher potential is used as the positive electrode active material, and a compound exhibiting a lower potential can be used as a negative electrode active material. For example, a compound having a positively higher redox potential may be used as a positive electrode active material.

In addition, the positive electrode current collector layer 1A and the negative electrode current collector layer 2A may include a positive electrode active material or a negative electrode active material, respectively. A content of an active material in each current collector layer is not particularly limited as long as it functions as a current collector. That is, an amount of active materials contained in a current collector can be arbitrarily selected. For example, when an active material is included, it is preferable that a positive electrode current collector/positive electrode active material or a negative electrode current collector/negative electrode active material have a volume ratio in a range of 90/10 to 70/30. Note that volumes of the positive electrode current collector and the negative electrode current collector refer to volumes of current collector materials other than active materials.

The positive electrode current collector layer 1A and the negative electrode current collector layer 2A include a positive electrode active material or a negative electrode active material, respectively, and thereby adhesion between the positive electrode current collector layer 1A and the positive electrode active material layer 1B, and adhesion between the negative electrode current collector layer 2A and the negative electrode active material layer 2B are improved.

[Solid Electrolyte]

Although the solid electrolyte 3 can be arbitrarily selected, it is preferable that it be a phosphate-based solid electrolyte. As the solid electrolyte 3, it is preferable to use a material having a low electron conductivity and a high lithium ion conductivity. Specifically, it is desirable that it be at least one selected from a group consisting of, for example, perovskite-type compounds such as $La_{0.5}Li_{0.5}TiO_3$, lithicon-type compounds such as $Li_{14}Zn(GeO_4)_4$, garnet-type compounds such as $Li_7La_3Zr_2O_{12}$, nasicon-type compounds such as $Li_{1.3}Al_{0.3}Ti_{1.7}(PO_4)_3$ or $Li_{1.5}Al_{0.5}Ge_{1.5}(PO_4)_3$, thio-lithicon-type compounds such as $Li_{3.25}Ge_{0.25}P_{0.75}S_4$ or $Li_3PS_4$, glass compounds such as $Li_2S$—$P_2S_5$ or $Li_2O$—$V_2O_5$—$SiO_2$, and phosphoric acid compounds such as $Li_3PO_4$, $Li_{3.5}Si_{0.5}P_{0.5}O_4$, and $Li_{2.9}PO_{3.3}N_{0.46}$.

(Liquid Repellent Film)

The liquid repellent film 5 is provided to be in contact with the laminated body 4. It is preferable that the liquid repellent film 5 be in direct contact with the laminated body 4. The liquid repellent film 5 is provided to cover an entire area which is not covered by the external terminal 20 in the surface of the laminated body 4. More specifically, all parts of the surface of the laminated body 4 except for parts electrically connected to allow conduction between the positive electrode layer 1and the external terminal 20 and between the negative electrode layer 2 and the external terminal 20 are covered. Such a covering structure is to form the external terminal 20 after the liquid repellent film 5 is formed on the surface of the laminated body 4. Details of a method of forming the liquid repellent film 5 will be described below.

The liquid repellent film 5 has a contact angle of 30° or more when an acetic acid aqueous solution is dropped thereon. Here, the "contact angle when the acetic acid aqueous solution is dropped" means that an angle formed between a sample surface and a droplet after 1000 msec after 2 μl of a 99.7% pure acetic acid aqueous solution is dropped on the laminated body 4 to which the liquid repellent film 5 is applied. The contact angle can be measured by a θ/2 method using, for example, a contact angle meter (Drop Master) manufactured by Kyowa Interface Science Co., Ltd.

In general, the contact angle is measured using water. On the other hand, the contact angle of the liquid repellent film 5 according to the present embodiment is measured using an acetic acid aqueous solution. This is because with contact angle measurement using water, it may not be possible to clearly determine whether an effect of preventing an entry of an organic acid is sufficient. It is possible to perform stricter evaluation by using an acetic acid aqueous solution.

Figure 2:
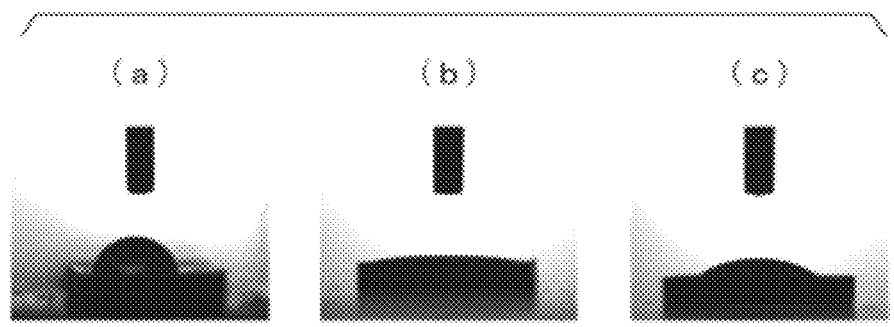
FIG. 2 is a view which shows differences in results of contact angle measurement when using water and when using an acetic acid aqueous solution.

FIG. 2 is a view which shows a difference in result of contact angle measurement when using water and when using an acetic acid aqueous solution. FIG. 2(a) is a result of contact angle measurement when water is dropped on the laminated body 4 on which the liquid repellent film 5 is not formed. FIG. 2(b) shows a result of the contact angle measurement when an acetic acid aqueous solution is dropped on the laminated body 4 on which the liquid repellent film 5 is not formed. FIG. 2(c) shows a result of the contact angle measurement when an acetic acid aqueous solution is dropped on the laminated body 4 on which the liquid repellent film 5 is formed. The contact angle of a droplet shown in FIG. 2(a) is 75.5°, the contact angle of a droplet shown in FIG. 2(b) is 9.3°, and the contact angle of a droplet shown in FIG. 2(c) is 31.4°.

As shown in FIG. 2(a), in the case of using water for the droplets, a large contact angle is exhibited. This is caused by a high surface tension of water. A surface of the laminated body 4 is a surface obtained by sintering solid electrolyte particles, and there are many fine irregularities and voids. Water having a high surface tension cannot penetrate into these irregularities and voids, and is repelled. For this reason, even if the liquid repellent film 5 is not formed, a large contact angle is shown and performance of the liquid repellent film 5 cannot be appropriately determined.

On the other hand, as shown in FIG. 2(b) and FIG. 2(c), when an acetic acid aqueous solution is used as a droplet, a difference in liquid repellency according to presence or absence of the liquid repellent film 5 can be determined using the contact angle. If an acetic acid is added to water, since the surface tension of water is reduced, the acetic acid aqueous solution penetrates into fine irregularities or voids. As a result, in the laminated body 4 in which the liquid repellent film 5 is not formed, the dropped acetic acid aqueous solution conforms to the laminated body 4 and the contact angle decreases. On the other hand, if the liquid repellent film 5 is formed, the liquid repellent film 5 repels the acetic acid aqueous solution, and the contact angle becomes 30° or more.

Acetic acid is a type of organic acid. Acetic acid is added to reduce the surface tension of water, and a similar tendency can be obtained with other organic acids if a predetermined liquid repellency as with aqueous acetic acid solution can be exhibited. Other organic acids include, for example, dicarboxylic acids, malonic acid, succinic acid, maleic acid, glutaric acid, suberic acid, adipic acid, sebacic acid, and the like. These are organic acids which are contained in the solder 30, and may penetrate inside the laminated body 4. Acetic acid has an acid dissociation constant which is moderate amongst acids, is a liquid at room temperature, and is easily used in the contact test.

The liquid repellent film 5 contains a fluorine element and a carbon element. It is preferable that the liquid repellent film 5 be formed of a fluorine-based polymer. Carbon atoms mainly form a main skeleton of the liquid repellent film 5, and the fluorine element contributes to liquid repellency. It is preferable that the liquid repellent film 5 contain a fluorine-based polymer, and be substantially formed from only a fluorine-based polymer.

It is preferable that the liquid repellent film 5 have a chemical structure represented by $(-CF_2-)_n$. That is, it is preferable to set a molecular structure in which two fluorine elements are connected to one carbon element as one unit, and to have a repeating structure of this. In this case, a relationship of "a carbon element":"a fluorine element"=1.0:2.0 is established.

On the other hand, there may be cases in which three fluorine elements are connected to one carbon element at an end, the carbon element chain branches midway, part of the fluorine elements are replaced with other elements, and/or the like. For this reason, an existence ratio of a fluorine element with respect to a carbon element in the liquid repellent film 5 is preferably 0.6 times or more and 2.5 times or less, is more preferably 1.0 times or more and 2.5 times or less, and is further preferably 1.5 times or more and 2.0 times or less.

Moreover, existence ratios of a hydrogen element and a silicon element in the liquid repellent film 5 can be arbitrarily selected, but each is preferably 1 mol % or less. Each is more preferably 0.1 mol % or less, and still more preferably 0.01 mol % or less. The existence ratios may also be 0 mol %. The hydrogen element in the liquid repellent film 5 affects the liquid repellency of the liquid repellent film 5. If the amount of the hydrogen element increases, the hydrophilicity increases and the protective effect from an organic acid decreases. In addition, there is a concern that a silicon element may react with the solid electrolyte 3. For this reason, although it can protect the laminated body 4 from the entry of an organic acid, it may cause other problems. Moreover, like a silane coupling agent, a silane-based liquid repellent agent cannot sufficiently obtain the effect of protection from an organic acid. The hydrogen element and the silicon element in the liquid repellent film 5 preferably have the values described above regardless of whether they are contained in the fluorine-based polymer or not.

In addition, it is preferable that the existence ratio of a fluorine element detected when the liquid repellent film 5 is measured from the outer surface side by X-RAY photoelectron spectroscopy (ESCA) be 35% or more. The amount of a fluorine element can be arbitrarily selected if necessary, but the existence ratio of a fluorine element may be, for example, 40% or more and may be 45% or more. The upper limit of the existence ratio of a fluorine element can be arbitrarily selected. For example, it may be 80% or less, 75% or less, 70% or less, 65% or less, or 60% or less.

In addition, an existence ratio of an oxygen element detected when the liquid repellent film 5 is measured from the outer surface side by X-RAY photoelectron spectroscopy (ESCA) can be arbitrarily selected, and can be, for example, 13% or less. The existence ratio of an oxygen element is preferably 10% or less. The existence ratio of an oxygen element may be 8% or less, 5% or less, or 3% or less. It may also be 0%. The amount of oxygen measured as described below can also be used to confirm a thickness of the film.

ESCA is a method of irradiating a solid surface with X rays and analyzing electrons ejected from atoms on the surface which have received energy from the X-rays. It may be used for measurement of the elements described above. In this method, since photoelectrons generated at a deep place are absorbed until they come out to the surface, an analysis depth in ESCA is about several tens of atomic layers (3 to 5 nm).

When the liquid repellent film 5 is sufficiently thin, among elements identified when the liquid repellent film 5 is measured from the outer surface side by X-RAY photoelectron spectroscopy (ESCA), elements derived from the laminated body 4 are also detected. An oxygen element is mainly an element derived from the laminated body 4, and a part of the carbon element is also derived from the laminated body 4.

For this reason, an amount of an oxygen element measured in ESCA can be converted into a thickness of the liquid repellent film 5. If the thickness of the liquid repellent film 5 becomes thinner, a measurement ratio of an element derived from the laminated body 4 increases, and, if the thickness of the liquid repellent film 5 becomes thicker, the measurement ratio of an element derived from the laminated body 4 decreases.

The existence ratio of an oxygen element exceeding 10% means that the thickness of the liquid repellent film 5 is very thin. For this reason, a probability that a part of the laminated body 4 is exposed without being covered by the liquid repellent film 5 is increased. On the other hand, if the existence ratio of an oxygen element is 10% or more, the thickness of the liquid repellent film 5 is sufficient, and the laminated body 4 can be reliably protected from an organic acid.

On the other hand, the existence ratio of a fluorine element is derived from the thickness of the liquid repellent film 5 and a molecular structure of molecules constituting the liquid repellent film 5. If the thickness of the liquid repellent film 5 is sufficiently thick, the laminated body 4 can be reliably protected from an organic acid. In addition, if the amount of a fluorine element contained in the molecules constituting the liquid repellent film 5 gets larger, the liquid repellency with respect to an organic acid improves.

The thickness of the liquid repellent film 5 can be arbitrarily selected, but is preferably 1 nm or more and 1 μm or less. Within this range, for example, 1 nm to 50 nm, 50 to 100 nm, 100 nm to 600 nm, 600 nm to 1 μm, or a combination of these may be used. The lower limit of the liquid repellent film 5 is difficult to be strictly measured. However, even when an element derived from the laminated body 4 is identified by ESCA as described above, the sufficient liquid repellency with respect to an organic acid can be indicated, and it can be said that it can function as the liquid repellent film 5 even with the thickness of about 1 nm. On the other hand, the liquid repellent film 5 has no limitation on increasing the thickness. However, if the liquid repellent film 5 is made too thick, there is a possibility that it is difficult to secure conduction between the external terminal 20 and the positive electrode layer 1, and between the negative electrode layer 2 and the external terminal 20.

Moreover, heat resistance of the liquid repellent film 5 is arbitrarily selected, but is preferably 200° C. or more, and is more preferably 250° C. or more. Here, the heat resistance refers to a temperature at which the liquid repellent film 5 does not volatilize when it is heated at a predetermined temperature.

Although the details will be described below, when the mounted body 100 is produced, a reflow process for performing reflow of the solder 30 is performed. In the reflow process, the solid-state lithium ion rechargeable battery 10 is heated. If the liquid repellent film 5 does not have sufficient heat resistance, the liquid repellent film 5 may be volatilized during the reflow process.

(External Terminal)

The external terminal 20 is electrically connected to the electrode 41 of the substrate 40. The external terminal 20, as shown in FIG. 1, is formed to be in contact with a side surface of the laminated body 4 (an exposed surface of an end surface of the positive electrode layer 1 and the negative electrode layer 2).

For the external terminal 20, it is preferable to use a material having high conductivity. For example, silver, gold, platinum, aluminum, copper, tin, nickel, gallium, indium, and an alloy thereof can be used.

Figure 3:
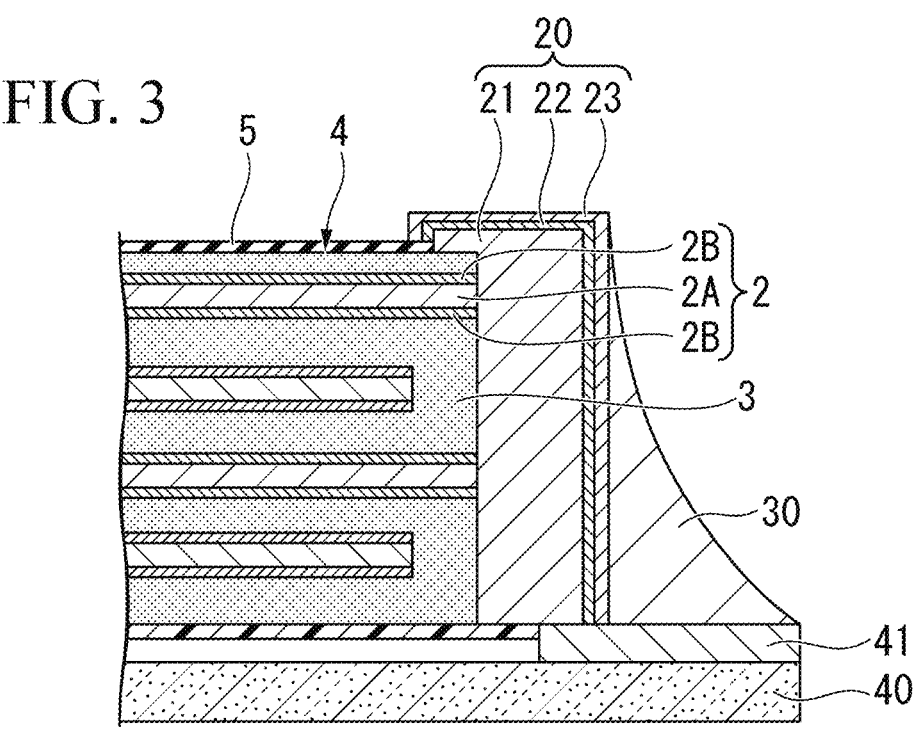
FIG. 3 is a schematic cross-sectional view of a preferred example of the mounted body according to the first embodiment of the present disclosure in which a main part in the vicinity of an external terminal is enlarged.

The external terminal 20 may be a single layer or a plurality of layers. For example, as shown in FIG. 3, a three-layer structure of a metal layer 21, a first plating layer 22, and a second plating layer 23 from a laminated body side may also be used. The material of each layer can be arbitrarily selected, but, for example, copper can be used for the metal layer 21, for example, nickel can be used for the first plating layer 22, and, for example, tin or the like can be used for the second plating layer 23.

The first plating layer 22 and the second plating layer 23 form an alloy with the solder 30 and is joined therewith. For this reason, the first plating layer 22 or the second plating layer 23 may be impregnated with an organic acid contained in the solder 30. The liquid repellent film 5 is preferably present between the laminated body 4 and end portions of the first plating layer 22 and the second plating layer 23 such that the organic acid with which the first plating layer 22 or the second plating layer 23 is impregnated does not erode the laminated body 4.

(Substrate)

The substrate 40 includes the electrode 41 and the supporting body 42. The substrate 40 is a so-called mounted substrate. The electrode 41 may be anything having conductivity. In the supporting body 42, an element or the like for operating the mounted solid-state lithium ion rechargeable battery 10 may be formed.

[Manufacturing Method of Mounted Body]

(Formation of Laminated Body)

Any method can be selected as a method of forming the laminated body 4, and, for example, a simultaneous firing method may be used, and a sequential firing method may also be used.

The simultaneous firing method is a method of producing a laminated body by collective firing after materials forming the respective layers are laminated. The sequential firing method is a method of each layer in order, and a method of performing firing process each time when each layer is produced. In using the simultaneous firing method, it is possible to form the laminated body 4 with fewer work processes than in using the sequential firing method. In addition, the obtained laminated body 4 becomes denser in using the simultaneous firing method than in using the sequential firing method. Hereinafter, a case of manufacturing the laminated body 4 using the simultaneous firing method will be described as an example.

The simultaneous firing method includes a process of creating pastes of each material constituting the laminated body 4, a process of producing a plurality of green sheets by applying each paste thereto and drying it, and a process of laminating the green sheets to form laminated sheets, and performing the simultaneous firing thereon.

First, each material of the positive electrode current collector layer 1A, the positive electrode active material layer 1B, the solid electrolyte 3, the negative electrode active material layer 2B, and the negative electrode current collector layer 2A constituting the laminated body 4 is turned into a paste.

A method of turning each material into a paste is not particularly limited thereto. For example, powder of each material is mixed with a vehicle to obtain a paste. Here, the vehicle is a generic term for a medium in a liquid phase. The vehicle preferably includes solvent and binder.

Using the methods described above, a paste for the positive electrode current collector layer 1A, a paste for the positive electrode active material layer 1B, a paste for the solid electrolyte 3, a past for the negative electrode active material layer 2B, and a paste for the negative electrode current collector layer 2A are produced.

Then, green sheets are created. The green sheets are obtained by applying the produced pastes onto a substrate such as a polyethylene terephthalate (PET) film, and peeling the substrate off from the sheets after drying it if necessary. The method of applying a paste is not particularly limited. For example, known methods such as screen printing, application, transferring, doctor blading, and the like can be adopted.

Next, the respective produced green sheets are laminated in a desired order by the number of laminations to be a laminated sheet. When the green sheets are laminated, alignment, cutting, or the like is performed if necessary. For example, when batteries of a parallel type or a series-parallel type are produced, it is preferable that alignment be performed such that an end surface of the positive electrode current collector layer and an end surface of the negative electrode current collector layer do not coincide with each other and the green sheets be laminated.

The laminated sheet may be produced using a method of producing the positive electrode active material layer unit and the negative electrode active material layer unit to be described below, separately, and laminating them. The positive electrode active material layer unit and the negative electrode active material layer unit may have the same shapes or sizes, or may have different shapes or sizes.

First, the paste for the solid electrolyte 3 is applied to a substrate such as the PET film using a doctor blade method and is dried to form a sheet-shape solid electrolyte layer 3. Next, the paste for the positive electrode active material layer 1B is printed on the solid electrolyte 3 using screen printing and is dried to form the positive electrode active material layer 1B. Next, the paste for the positive electrode current collector layer 1A is printed on the positive electrode active material layer 1B using screen printing and is dried to form the positive electrode current collector layer 1A. Furthermore, the paste for the positive electrode active material layer 1B is printed on the positive electrode current collector layer 1A using screen printing and is dried to form the positive electrode active material layer 1B.

Thereafter, a positive electrode active material layer unit is obtained by peeling the PET film off. The positive electrode active material layer unit is a laminated sheet in which the solid electrolyte layer 3, the positive electrode active material layer 1B, the positive electrode current collector layer 1A, and the positive electrode active material layer 1B are laminated in this order.

In a similar procedure, a negative electrode active material layer unit is produced. The negative electrode active material layer unit is a laminated sheet in which the solid electrolyte layer 3, the negative electrode active material layer 2B, the negative electrode current collector layer 2A, and the negative electrode active material layer 2B are laminated in this order.

Next, a single positive electrode active material layer unit and a single negative electrode active material layer unit are laminated. At this time, these are laminated such that the solid electrolyte layer 3 of the positive electrode active material layer unit and the negative electrode active material layer 2B of the negative electrode active material layer unit, or the positive electrode active material layer 1B of the positive electrode active material layer unit and the solid electrolyte layer 3 of the negative electrode active material layer unit are in contact with each other. As a result, a laminated sheet in which the positive electrode active material layer 1B, the positive electrode current collector layer 1A, the positive electrode active material layer 1B, the solid electrolyte layer 3, the negative electrode active material layer 2B, the negative electrode current collector layer 2A, the negative electrode active material layer 2B, and the solid electrolyte layer 3 are laminated in this order is obtained.

Note that, when the positive electrode active material layer unit and the negative electrode active material layer unit are laminated, respective units are shifted and laminated such that the positive electrode current collector layer 1A of the positive electrode active material layer unit extend only to one end surface and the negative electrode current collector layer 2A of the negative electrode active material layer unit extends only to the other side. Thereafter, a sheet for the solid electrolyte layer 3 with a predetermined thickness separately prepared is further laminated onto a surface of a side, on which there is no solid electrolyte layer 3, of the laminated body in which the units are alternately laminated and is assumed as a laminated sheet.

Next, the produced laminated sheets are collectively pressure-bonded. It is preferable that pressure bonding is performed while heating. A heating temperature at the time of pressure bonding can be arbitrarily selected, and is set to, for example, 40 to 95° C.

Next, pressure-bonded laminated sheets are collectively subjected to simultaneous firing to form a laminated body 4 made of a sintered body. Firing conditions of the laminated sheet can be arbitrarily selected, and firing is performed by, for example, heating at 600° C. to 1000° C. in a nitrogen atmosphere. Firing time is set to, for example, 0.1 to 3 hours.

The obtained sintered body (the laminated body 4) may be input into a cylindrical container together with abrasives such as alumina and barrel-polished. As a result, corner cutting of corners of the laminated body 4 can be performed. As another method, the laminated body 4 may also be polished by a sand blast. This method is preferable because only a specific part can be sharpened.

In the sintered body (the laminated body 4), a relative density of the positive electrode layer, a relative density of the negative electrode layer, and a relative density of the solid electrolyte sandwiched between the positive electrode layer and the negative electrode layer may also be 80% or more. A higher relative density has an easier connection of diffusion paths of moveable ions in a crystal, and ions conductivity is improved.

The laminated body 4 is obtained by the above processes.

(Formation of Liquid Repellent Film)

Next, a liquid repellent film 5 is formed to cover the obtained laminated body 4. The liquid repellent film 5 can be formed by dry coating using plasma gas. First, the laminated body 4 is placed between two electrodes installed in a gas atmosphere of a fluorocarbon compound. Then, if a voltage is applied between the two electrodes, electrons and ions collide with gas molecules and are turned into plasma to form radical. Since the radical is chemically unstable, it reacts on the surface of the laminated body 4, and the liquid repellent film 5 is formed. In the method of placing the laminated body, a mounted position, and/or a position at which the laminated body is supported can be arbitrarily selected.

Time for exposing the laminated body 4 to a plasma environment (plasma processing) can be arbitrarily selected, but it is preferably 3 minutes or more, and more preferably 6 minutes or more. If the plasma processing time is short, there is a possibility that the liquid repellent film 5 of a sufficient thickness cannot be obtained. In addition, the plasma processing time is also affected by the applied voltage. The voltage applied between two electrodes is preferably 200 V or more. A flow rate of fluorocarbon gas at the time of plasma processing varies with processing time, a processing voltage, and processing chamber size, but is preferably 10 sccm or more and 100 sccm or less.

The fluorocarbon compound used in the gas atmosphere used when the laminated body 4 is placed can be arbitrarily selected. For example, it is possible to use ethane hexafluoride, perfluorocyclobutane, or the like.

Ethane hexafluoride forms —$CF_3$ as main radical. Perfluorocyclobutane forms (—$CF_2$-)$_n$ (n is a natural number between 1 to 4) as main radical. Since (—$CF_2$-)$_n$ is not closed at both ends, unit structures of these can be connected to form a polymer compound. That is, when perfluorocyclobutane is used, it is possible to freely control a thickness of the liquid repellent film 5 by changing plasma irradiation time.

A place of a surface on which the liquid repellent film is formed may be arbitrarily set if necessary. For example, the liquid repellent film may be formed at a predetermined position, or unnecessary parts may be deleted after the liquid repellent film is formed.

The liquid repellent film 5 formed by dry coating can suppress the liquid repellent film 5 from containing unnecessary elements. For example, in the case of the dipping method of dipping the laminated body 4 into a solution having water repellency, the solution needs to be liquid at normal temperature and pressure. In order to maintain the solution in a liquid state, a hydrogen element and the like are required in molecular chains constituting the solution. If the amount of the hydrogen element increases, the hydrophilicity increases and the protective effect from organic acid decreases.

For example, polyflon PTFE-D manufactured by Daikin Industries, Ltd. is a solution which can be used for the dipping method, and is a polytetrafluoroethylene (PTFE) dispersing liquid composed only of a fluorine element and a carbon element. This liquid can cover the liquid repellent film 5 on the surface of the laminated body 4 using the dipping method, but a particle diameter is as large as 0.15 μm to 0.35 μm and is less likely to form a dense film. Moreover, if the film thickness is increased to obtain a dense film, it will be difficult to produce the external terminal 20.

(Formation of External Terminal)

Next, the external terminal 20 is formed on the laminated body 4 on which the liquid repellent film 5 is formed. After the external terminal 20 is formed, the surface of the laminated body 4 is not exposed to the outside. A method of forming the external terminal 20 can be arbitrarily selected. For example, the external terminal 20 can be preferably formed using a sputtering method. In the sputtering method, target particles generated by a collision of ions are caused to collide with the surface of the laminated body 4 on which the liquid repellent film 5 is formed. Since the colliding target particles collide with momentum, they penetrate a part of the liquid repellent film 5 and reach the surface of the laminated body 4. By penetrating a part of the liquid repellent film 5, the positive electrode layer 1 or the negative electrode layer 2 of the laminated body 4 is electrically connected to the external terminal 20. For the target, a material constituting the external terminal 20 can be used. A method of providing the external terminal 20 at a desired position may be arbitrarily selected.

As shown in FIG. 3, when the external terminal 20 is formed from a plurality of metals, each layer may be laminated while changing the target, or plating processing may be performed on the metal layer 21 formed by the sputtering method. Since plating is deposited only in an electric conductive portion, no plating layer is formed at unnecessary places.

In addition, after the liquid repellent film 5 of a portion forming the external terminal 20 is removed, the external terminal 20 may be formed. In this case, the external terminal 20 can be formed by a known method such as the sputtering method. On the other hand, there is a possibility that an electrical connection may not be obtained if the removal of the liquid repellent film 5 is not sufficient, and there is a possibility that the sufficient effect of preventing the entry of an organic acid may not be obtained if a place from which the liquid repellent film 5 is removed is reliably covered with the external terminal 20. Therefore, it is important to find a preferred condition.

(Formation of Mounted Body)

Next, the external terminal 20 and the electrode 41 are connected to produce the mounted body 100. First, the substrate 40 in which the electrode 41 is formed is prepared. Then, the solder 30 are pasted and printed on the electrode 41. Then, the solid-state lithium ion rechargeable battery 10 is mounted on the substrate 40 such that the pasted and printed solder 30 and the external terminal 20 are brought in contact.

Then, these are heated by a reflow furnace. A heating temperature can be arbitrarily selected, but it is more than a temperature at which the solder 30 melts, and it is preferable to be, for example, 200° C. or more. The melted solder 30 joins with the external terminal 20 to form the mounted body 100. A water repellent film or the like formed by the dipping method cannot withstand this reflow process and often volatilizes, but the liquid repellent film 5 formed by plasma irradiation has heat resistance and does not volatilize.

The solder 30 gets wet and spreads to the surface of the external terminal 20 at the time of the reflow process. An organic acid (flux) containing the solder 30 gets wet and spreads to the surface of the external terminal 20 together with the solder 30. On the other hand, since a portion in which the liquid repellent film 5 is formed has poor wettability with respect to the organic acid, the solder 30 does not get wet and spread to the surface of the liquid repellent film 5. For this reason, due to effects of the liquid repellent film 5, there is no direct contact between the solder 30 and the laminated body 4, and it is possible to prevent the entry of the organic acid into the laminated body 4.

As described above, since the solid-state lithium ion rechargeable battery according to the present embodiment includes the liquid repellent film 5 provided to be in contact with the laminated body 4, it is possible to prevent the entry of the organic acid into the laminated body 4, and to reduce a failure rate of the mounted body 100 after mounted.

As described above, embodiments of the present disclosure is described in detail with reference to the drawings.

As described above, each configuration in each embodiment, a combination thereof, and the like are examples, and additions, omissions, substitutions, and other modifications of the configuration can be made within a range not departing from the spirit of the present disclosure.

EXAMPLES

Example 1

The laminated body 4 in which the solid electrolyte layer 3, the positive electrode active material layer 1B, the positive electrode current collector layer 1A, the positive electrode active material layer 1B, the solid electrolyte layer 3, the negative electrode active material layer 2B, the negative electrode current collector layer 2A, the negative electrode active material layer 2B, and the solid electrolyte layer 3 are laminated in this order is produced by the simultaneous firing method. The configuration of each layer is as follows.

The positive electrode current collector layer 1A and the negative electrode current collector layer 2A: $Cu+Li_3V_2(PO_4)_3$ The positive electrode active material layer 1B and the negative electrode active material layer 2B: $Li_3V_2(PO_4)_3$ The solid electrolyte 3: $Li_{1.3}Al_{0.3}Ti_{1.7}(PO_4)_3$ A temperature at the time of the simultaneous firing is set to 800° C., and firing time is set to 1 hour.

Next, the liquid repellent film 5 is formed on the produced laminated body 4. Specifically, the laminated body 4 is placed between two electrodes installed in a perfluorocyclobutane atmosphere, and a voltage of 200V is applied between the two electrodes for three minutes. At this time, gas on which the laminated body 4 is placed is 100% of perfluorocyclobutane.

Titanium is produced at both ends of the laminated body 4 by sputtering, and furthermore nickel and silver are applied to the surface by sputtering to produce the external terminal 20. At this time, the surface of the laminated body 4 is not exposed to the outside because it is covered directly by the liquid repellent film 5 or silver. The obtained solid-state lithium ion rechargeable battery is mounted on a printed substrate printed with the solder paste. Then, this is heated by a reflow furnace to obtain a mounted body 100 in which the external terminal 20 and the electrode 41 are joined. The heating temperature of the reflow furnace is 260° C.

Figure 4:
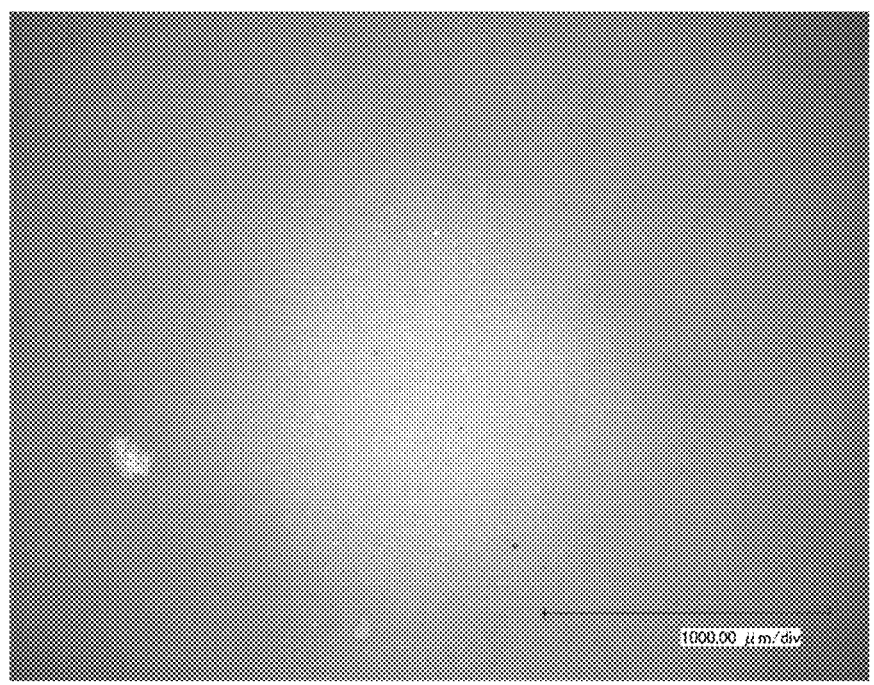
FIG. 4 is a view which shows a result of observing a surface of a film after dropping acetic acid onto a liquid repellent film according to Example 1.

In addition, 2 μl of the 99.7% pure acetic acid aqueous solution is dropped on the liquid repellent film 5 formed on the laminated body 4 before mounted, and the contact angle after 1000 msec is measured by the θ/2 method. At the time of the measurement, the drop master manufactured by Kyowa Interface Science Co., Ltd. is used. In addition, the liquid repellent film 5 is measured from the outer surface side by ESCA and a component analysis of contained elements is performed. Furthermore, the surface of the liquid repellent film 5 after an acetic acid is dropped is observed using a microscope. FIG. 4 shows a result of the observation of the surface after an acetic acid is dropped on the liquid repellent film according to Example 1. In addition, 100 mounted bodies are produced and a failure rate after dropping of an organic acid is measured under the same conditions. Results of these are shown in Table 1.

Example 2

Example 2 differs from Example 1 only in that the plasma processing is performed for six minutes. The other conditions are the same as those in Example 1, and the contact angle, the elemental analysis, the surface observation, the failure rate are measured.

Example 3

Example 3 differs from Example 1 in a gas volume ratio (perfluorocyclobutane:ethane hexafluoride=7:3). The other conditions are the same as those in Example 1, and the contact angle, the elemental analysis, the surface observation, the failure rate are measured.

Example 4

Example 4 differs from Example 3 only in that the plasma processing is performed for six minutes. The other conditions are the same as those in Example 3, and the contact angle, the elemental analysis, the surface observation, the failure rate are measured.

Example 5

Example 5 differs from Example 1 only in that the plasma processing is performed for one minute. The other conditions are the same as those in Example 1, and the contact angle, the elemental analysis, the surface observation, the failure rate are measured.

Example 6

Example 6 differs from Example 1 in that the plasma processing is performed for one minute and the gas volume ratio (perfluorocyclobutane:ethane hexafluoride=7:3) is set. The other conditions are the same as those in Example 1, and the contact angle, the elemental analysis, the surface observation, the failure rate are measured.

Example 7

Example 7 differs from Example 1 only in that gas at the time of the plasma processing is 100% fluorinated ethane. The other conditions are the same as those in Example 1, and the contact angle, the elemental analysis, the surface observation, the failure rate are measured.

Comparative Example 1

Figure 5:
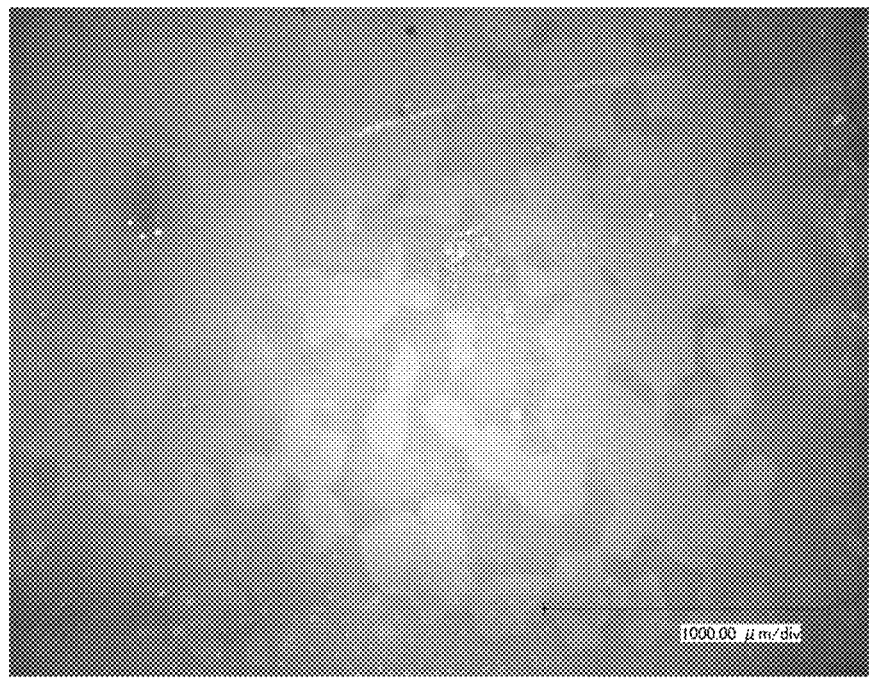
FIG. 5 is a view which shows a result of observing a surface of a film after dropping an acetic acid onto a liquid repellent film of a laminated body according to Comparative Example 1.

In Comparative example 1, a liquid repellent film is not formed. The other conditions are the same as those in Example 1, and the contact angle, the elemental analysis, and the surface observation are performed. FIG. 5 shows a result of observing a surface after an acetic acid is dropped on the laminated body according to Comparative example 1.

Comparative Example 2

In Comparative example 2, alkyl alkoxysilane is applied as a liquid repellent film using the dipping method. The other conditions are the same as those in Example 1, and the contact angle, the elemental analysis, and the surface observation are performed.

TABLE 1

|  | Contact angle (°) | Element analysis | | | | | Appearance inspection (ok/ng) | Failure rate after mounted (%) |
|---|---|---|---|---|---|---|---|---|
|  |  | C element (%) | F element (%) | O element (%) | H element (%) | Si element (%) | | |
| Example 1 | 34 | 38 | 57 | 5 | 0 | 0 | OK | 1 |
| Example 2 | 36 | 40 | 60 | 0 | 0 | 0 | OK | 0 |
| Example 3 | 31 | 54 | 36 | 10 | 0 | 0 | OK | 3 |
| Example 4 | 34 | 60 | 40 | 0 | 0 | 0 | OK | 0 |
| Example 5 | 34 | 40 | 48 | 10 | 0 | 0 | OK | 4 |
| Example 6 | 31 | 55 | 33 | 12 | 0 | 0 | OK | 10 |
| Example 7 | 31 | 52 | 35 | 13 | 0 | 0 | OK | 15 |
| Comparative example 1 | 9 | — | — | — | — | — | NG | 30 |
| Comparative example 2 | 14 | 26 | — | 9 | 61 | 5 | NG | 30 |

The mounted body shown in Examples 1 to 7 had a lower failure rate after mounted than the mounted body shown in Comparative examples 1 and 2. It is considered that it is because a liquid repellent film is not applied and the effect of preventing the entry of an organic acid into the laminated body cannot be obtained in Comparative example 1. In Comparative example 2, even if a liquid repellent film itself is applied, a contact angle with respect to the organic acid is less than 30°, and it is considered that the entry of the organic acid cannot be sufficiently prevented.

In addition, if FIG. 4 and FIG. 5 are compared, the laminated body according to Example 1 has a liquid repellent film that repels an organic acid, irregularities in appearance is not seen even if the organic acid is dropped. With regard to this, the liquid repellent film is impregnated with the laminated body according to Comparative example 1 and irregularities in appearance are confirmed.

In addition, Examples 1 to 5 in which the ratio of a fluorine element measured by ESCA is high have lower failure rates than Examples 6 and 7 in which the ratio of a fluorine element is low. Furthermore, Examples 1, 2, and 4 in which the ratio of an oxygen element measured by ESCA is low have lower failure rates than Examples 3 and 5 to 7 in which the ratio of an oxygen element is high.

INDUSTRIAL APPLICABILITY

A solid-state lithium ion rechargeable battery and a mounted body in which erosion of a solid electrolyte by an organic acid and failure thereof are curbed are provided.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte
4 Laminated body
5 Liquid repellent film
10 Solid-state lithium ion rechargeable battery
20 External terminal
21 Metal layer
22 First plating layer
23 Second plating layer
30 Solder
40 Substrate
41 Electrode
42 Supporting body
100 Mounted body

The invention claimed is:

1. A solid-state lithium ion rechargeable battery comprising:
a laminated body which includes a positive electrode layer, a negative electrode layer, and a solid electrolyte sandwiched between the positive electrode layer and the negative electrode layer; and
a liquid repellent film which is provided to be in contact with the laminated body,
wherein the liquid repellent film contains a fluorine element and a carbon element, and has a contact angle of 30° or more when an acetic acid aqueous solution having a purity of 99.7% is dropped thereon,
an existence ratio of the fluorine element with respect to the carbon element in the liquid repellent film is 1.5 times or more and 2.0 times or less, the existence ratio being detected when the liquid repellent film is measured from an outer surface side using an X-ray photoelectron spectroscopy,
the liquid repellent film is formed by deposition of perfluorocyclobutane on the laminated body,
the existence ratio of the fluorine element is 35% or more and 60% or less,
an existence ratio of an oxygen element detected when the liquid repellent film is measured from the outer surface side using the X-ray photoelectron spectroscopy is 10% or less,
existence ratios of a hydrogen element and a silicon element in the liquid repellent film are 1 mol % or less, respectively,
a thickness of the liquid repellent film is 1 μm or less,
heat resistance of the liquid repellent film is 200° C. or more, and
the positive electrode layer, the negative electrode layer, and the solid electrolyte sandwiched between the positive electrode layer and the negative electrode layer have relative density of 80% or more.

2. The solid-state lithium ion rechargeable battery according to claim 1, wherein the heat resistance of the liquid repellent film is 250° C. or more.

3. The solid-state lithium ion rechargeable battery according to claim 1, wherein the existence ratio of the fluorine element is 45% or more and 60% or less.

4. The solid-state lithium ion rechargeable battery according to claim 1, wherein the existence ratio of an oxygen element detected when the liquid repellent film is measured from the outer surface side using the X-ray photoelectron spectroscopy is 5% or less.

5. The solid-state lithium ion rechargeable battery according to claim 1, wherein the existence ratio of an oxygen element detected when the liquid repellent film is measured from the outer surface side using the X-ray photoelectron spectroscopy is 0%.

6. The solid-state lithium ion rechargeable battery according to claim 1, wherein the existence ratios of a hydrogen element and a silicon element in the liquid repellent film are each 0.1 mol % or less.

7. The solid-state lithium ion rechargeable battery according to claim 1, wherein the existence ratios of a hydrogen element and a silicon element in the liquid repellent film are each 0.01 mol % or less.

8. A mounted body comprising:
the solid-state lithium ion rechargeable battery according to claim 1;
an external terminal each connected to the positive electrode layer and the negative electrode layer of the solid-state lithium ion rechargeable battery; and
a substrate which is joined with the external terminal and the solid-state lithium ion rechargeable battery via a solder.

* * * * *